United States Patent
Hynd

[15] 3,650,726
[45] Mar. 21, 1972

[54] GLASS MELTING FURNACES HAVING HINGED FLOOR INSULATION

[72] Inventor: William Christie Hynd, Liverpool, England

[73] Assignee: Pilkington Brothers Limited, Liverpool, England

[22] Filed: Feb. 4, 1969

[21] Appl. No.: 796,423

[30] Foreign Application Priority Data

Feb. 16, 1968 Great Britain.....................7,790/68

[52] U.S. Cl..................................65/347, 65/134, 165/86, 263/46
[51] Int. Cl. ......................................................C03b 5/22
[58] Field of Search....................65/135, 347, 288, 337, 134; 263/46; 165/76, 86

[56] References Cited

UNITED STATES PATENTS

| 3,492,108 | 1/1970 | Augustin et al. | 65/99 A |
| 3,248,203 | 4/1966 | Cunningham | 65/337 |
| 3,233,991 | 2/1966 | Stalego | 65/11 |
| 2,119,949 | 6/1938 | Blau et al. | 65/134 |
| 3,393,989 | 7/1968 | Strausbaugh | 65/361 |

Primary Examiner—S. Leon Bashore
Assistant Examiner—Richard H. Anderson
Attorney—Morrison, Kennedy and Campbell

[57] ABSTRACT

A glass melting furnace has an array of blocks of thermal insulation material beneath its floor extending beneath the whole of the floor of the furnace, and has a hinged mounting for each block for moving each block from an inoperative position to an insulating position where it is locked facing the undersurface of the furnace floor, thereby providing selective insulation of the furnace floor.

4 Claims, 5 Drawing Figures

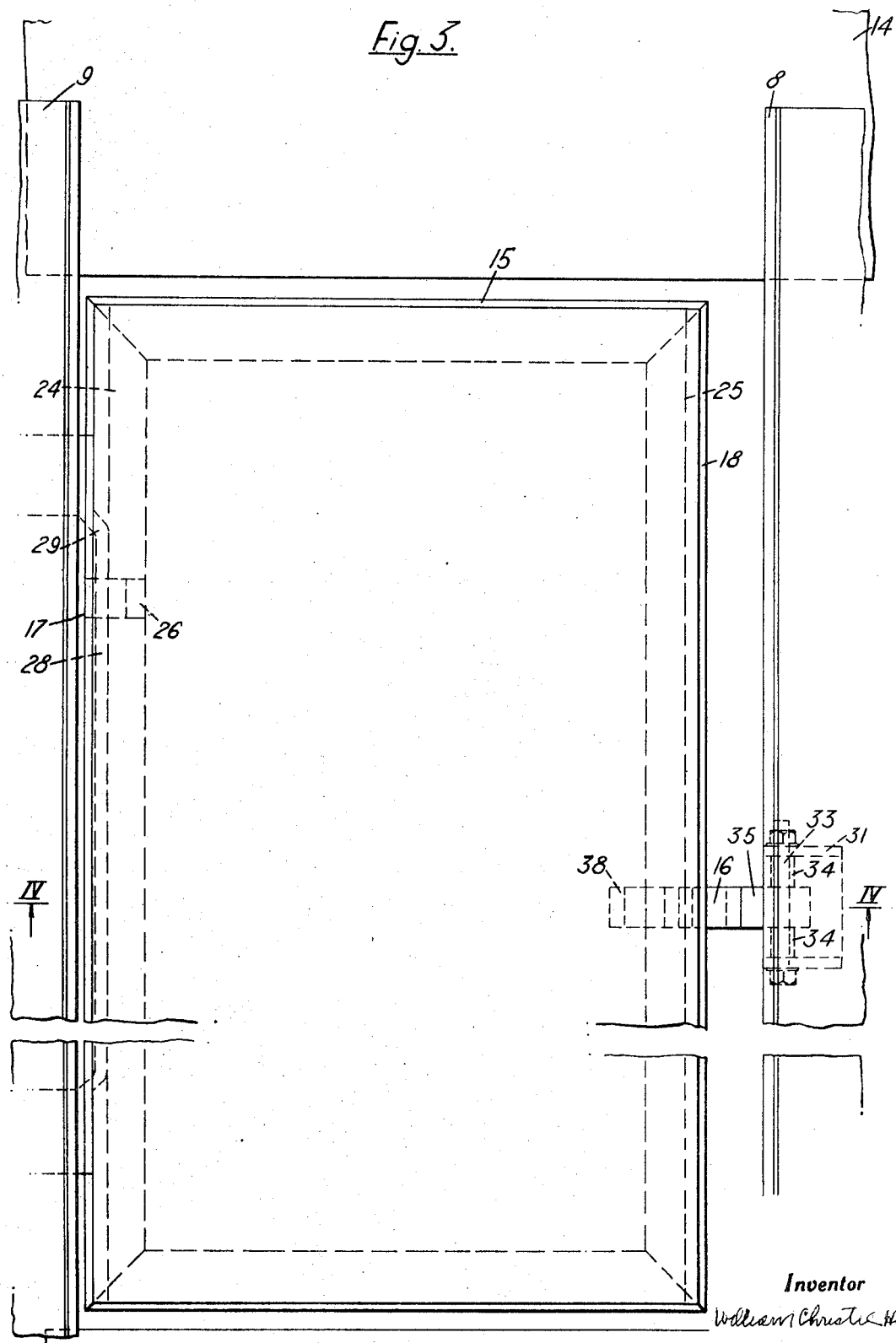

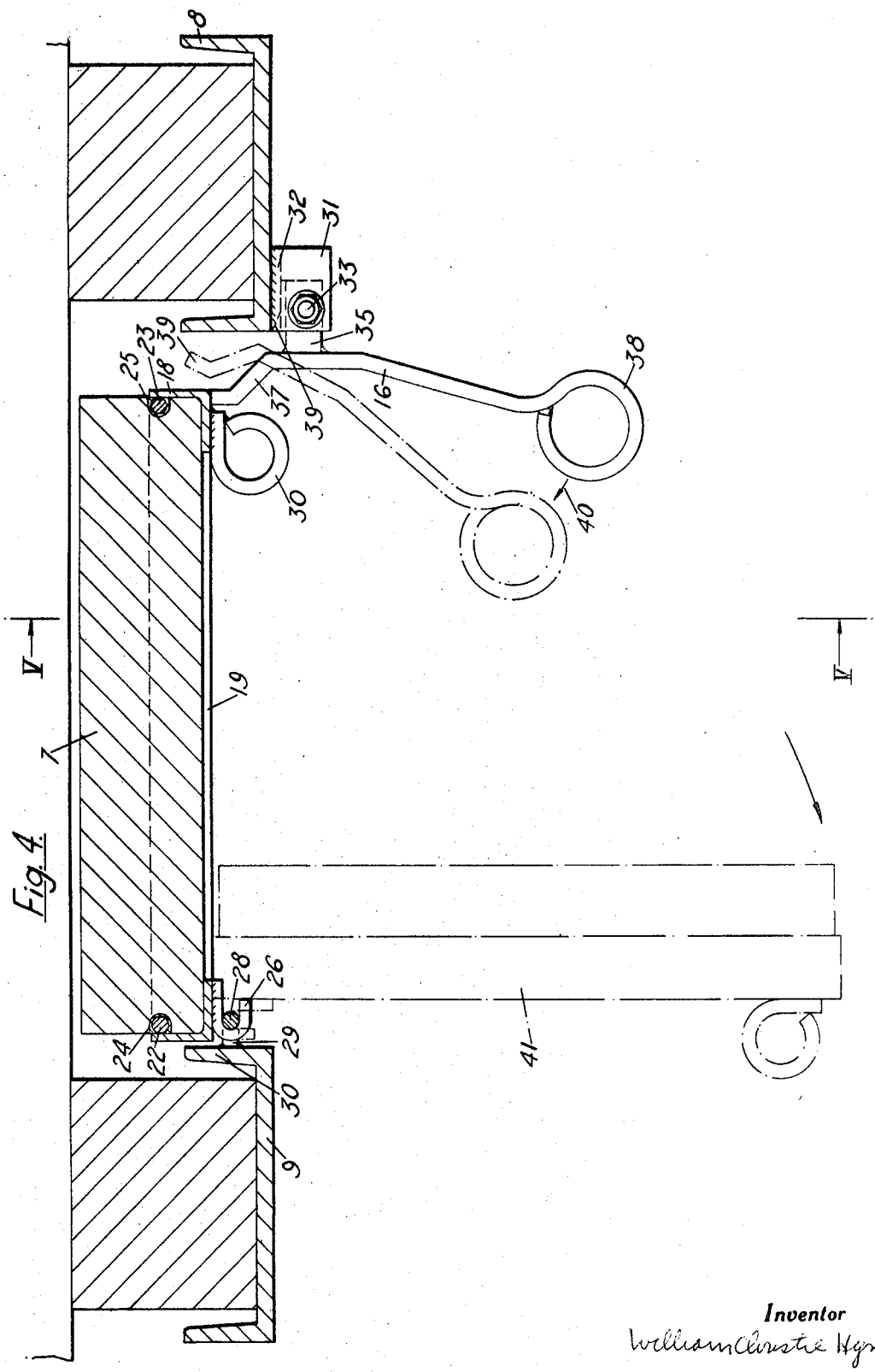

Patented March 21, 1972 3,650,726
5 Sheets-Sheet 5
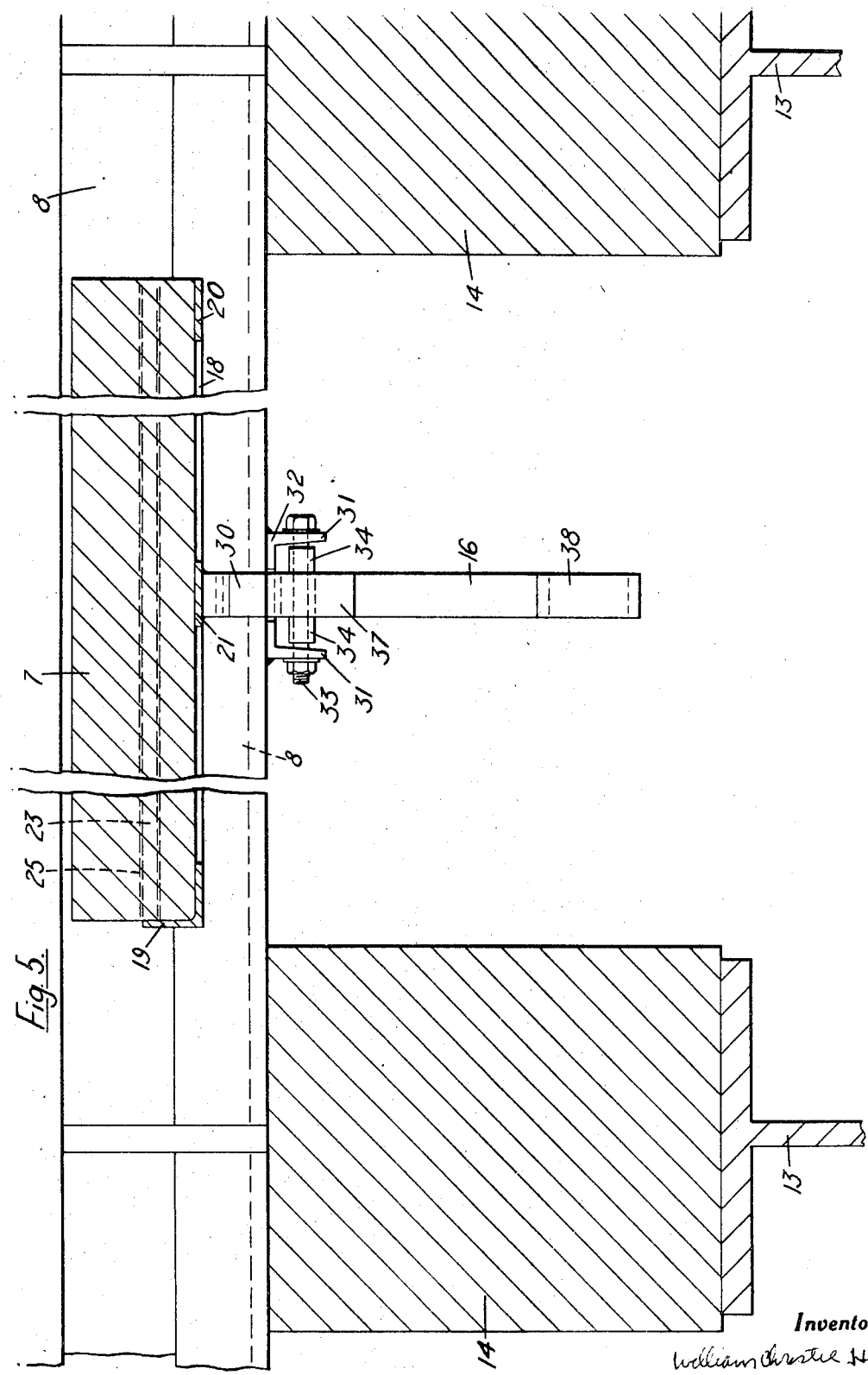

GLASS MELTING FURNACES HAVING HINGED FLOOR INSULATION

BACKGROUND OF THE INVENTION

1. Field of the Invention

This invention relates to glass melting furnaces and more especially to continuous glass melting furnaces of the kind in which glass forming materials are fed into one end of the furnace, usually termed the melt end, and there is an output of molten glass from the other end of the furnace usually termed the working end. The molten glass so produced is fed to a glass forming process, for example a process for the manufacture of flat glass in continuous ribbon form by vertically drawing the flat glass from a body of molten glass or by the float process in which glass in ribbon form is advanced along a bath of molten metal.

2. Description of the Prior Art

In furnaces of this kind there is a forward upper flow of molten material from the melt end of the furnace which forward flow carries the powdered glass forming materials which are fed on to the surfaces of the molten mass in the furnace. There is also a return flow of cooler molten glass along the floor of the furnace in the opposite direction to the forward flow and this lower flow cools as it moves over the furnace floor, there being heat loss by radiation from underneath the furnace floor.

It is desirable to maintain a steady temperature relationship between these upper and lower flows despite changing conditions in the environment of the furnace and despite any variation in the condition of the surface layer of molten material in the furnace, in which surface layer the powdered ingredients of the glass are being melted and absorbed.

Changing conditions of the surface layer of molten material may be produced, for example, when the composition of the batch which is introduced into the tank is changed. Glasses of different composition have different thermal conductivity characteristics and it is desirable to maintain uniform thermal conditions throughout the changeover.

It is a main object of the present invention to provide an improvement in glass melting furnaces which assists in maintaining desired thermal conditions in the furnace.

SUMMARY

According to the invention, there is provided a glass melting furnace in which the floor of the furnace is thermally insulated by an array of blocks of thermal insulation material each block being movable from an inoperative position spaced from the floor of the furnace to an insulating position in which the blocks are locked facing the undersurface of the furnace floor, thereby providing selective insulation of the floor of the furnace.

Each block may be hingedly mounted beneath the furnace so as to be latched in insulating position facing the undersurface of the floor and hinged away from the floor to the inoperative position.

By selectively applying the thermal insulation to different areas of the underneath of the floor of the furnace, the temperature of different parts of the lower flow of molten material in the furnace can be raised, and by means of this selective insulation, which regulates losses by radiation from different areas of the floor of the furnace, the currents in the molten glass at the bottom of the furnace can be controlled.

In a preferred embodiment of the invention, each insulating block is mounted in a tray which is hinged to a crossbeam mounted beneath the furnace floor, and a latch for holding the tray in position is mounted on an adjacent parallel crossbeam, the cross-beams being arranged in rows beneath the furnace to carry the blocks in a linear array beneath the furnace floor.

The whole of the bottom of the furnace floor may be provided with selective thermal insulation in this way although in some cases only a part of the furnace floor may be so insulated, for example the melt end.

The provision of a separate latch for holding each tray carrying its insulating block in position beneath the furnace floor enables the areas of the furnace floor selected for insulation to be selected rapidly and manually. To provide for this manual selection each tray is preferably latched in position by a latch lever which is pivotally mounted on one of said cross-beams, each latch lever being shaped so as to be releasable manually to permit the block in its tray to fall to its inoperative position.

Accordingly, the present invention also comprehends a method of continuously melting glass forming materials in a glass melting furnace to form a flow of molten glass for feeding to a glass forming process, in which an upper flow takes place in the molten material in the furnace over a lower flow in the opposite direction, characterized by maintaining a desired temperature relationship between the upper and lower flows in the glass by selectively altering the thermal insulation of areas of the floor of the furnace to regulate losses by heat radiation from the floor of the furnace.

BRIEF DESCRIPTION OF THE DRAWINGS

FIG. 3 is a plan view of one of the insulating blocks carried in a tray and showing the fittings associated with the tray and the supports for the insulating block, FIG. 4 is a section on line IV—IV of FIG. 3, and FIG. 5 is a section on line V—V of FIG. 4.

DESCRIPTION OF THE PREFERRED EMBODIMENT

Figure 1:
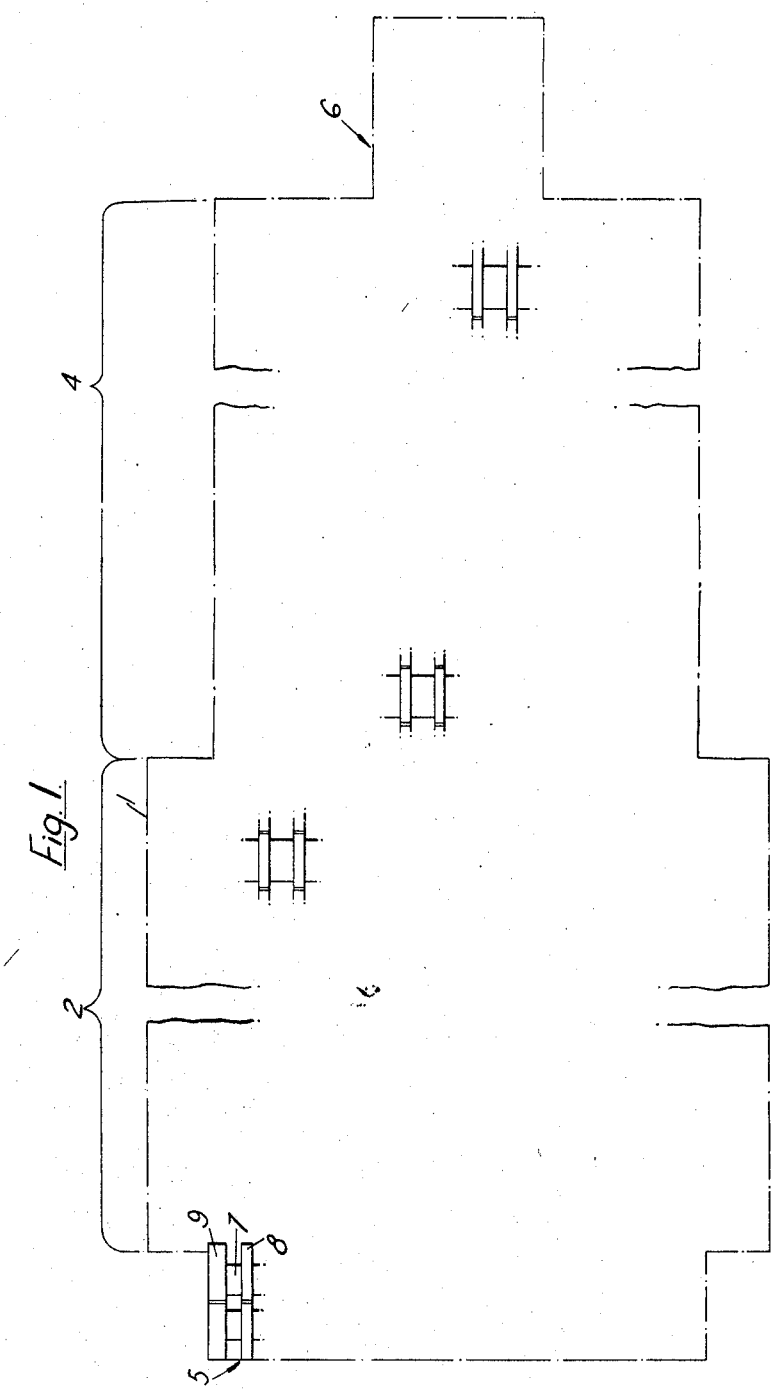
FIG. 1 is a plan view showing in chain-dotted lines the shape of the floor of a glass melting furnace and indicating the disposition of an array of insulating blocks according to the invention underneath the floor of the furnace.

Referring to the drawings the general shape of a glass melting furnace is indicated in FIG. 1 by the chain-dotted line 1 which indicates the shape of the melt end 2, and the working end 4 of the furnace. Powdered glass forming ingredients are fed to the furnace through the inlet indicated at 5 and a continuous flow of molten glass is drawn from the forehearth of the furnace indicated at 6.

According to the invention selectively adjustable thermal insulation is provided for the underneath of the floor of the furnace in order to regulate losses by heat radiation from different areas of the floor of the furnace and the general arrangement of an array of blocks of thermal insulation material is indicated diagrammatically in FIG. 1. Each block 7 of the array is mounted in a tray which will be illustrated in greater detail with reference to FIGS. 2 to 5, which tray is hingedly mounted between adjacent parallel cross-beams 8 and 9. Each tray is latched in insulating position, being hinged to one beam and latched to the adjacent parallel beam, and the cross-beams 8 and 9 are, as shown in FIG. 1, arranged in rows beneath the whole of the floor of the furnace so that the blocks 7 of insulation material are carried in a linear array beneath the furnace floor.

Figure 2:
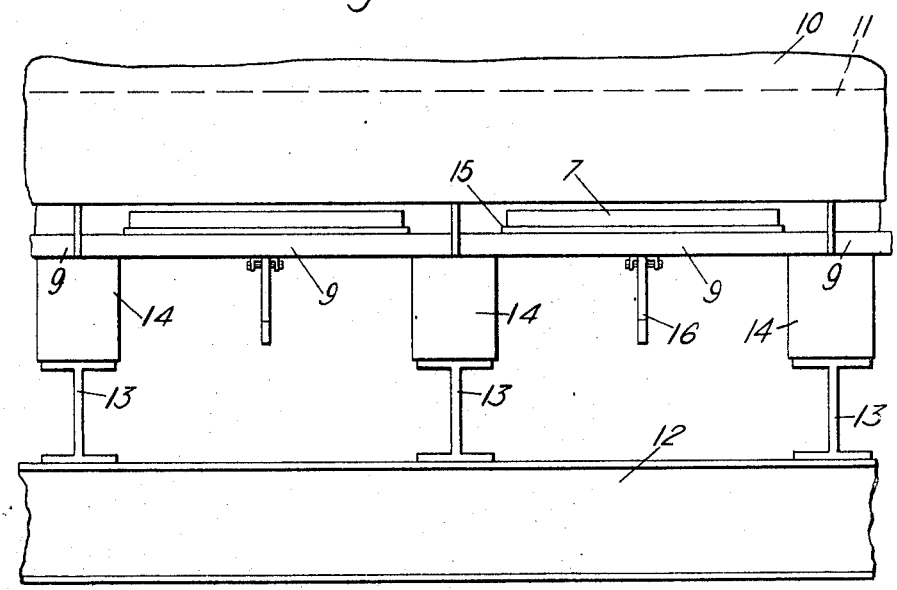
FIG. 2 is a side elevation of a part of the floor of the furnace showing the arrangement of insulating blocks beneath the floor.

In FIG. 2 a side wall of a part of the furnace, for example, a part of the melt end 2 of the furnace is indicated at 10 and the floor of the furnace is indicated at 11. The furnace floor consists of blocks of refractory material which are supported at a distance above a main support girder, indicated at 12, and the thermal insulation according to the invention is mounted in the space between the girder 12 and the bottom of the floor 11 of the furnace. Bottom I-beams 13 are mounted on the girder 12 and these bottom beams are mounted parallel to each other and extend transversely beneath the furnace floor. On each of the beams 13 there is erected a brick wall 14 whose thickness is of the same order as the width of the top of the beam 13. The cross-beams 8 and 9 are mounted between each pair of adjacent brick walls 14, and the cross-beams are in the form of U-channel members. Each of these cross-beams 8 and 9 extends only between two adjacent brick walls 14, being supported on the tops of the brick walls.

The cross-beams 8 and 9 are, as indicated in FIG. 2, supported end-to-end right along the length of the furnace.

Each of the insulating blocks 7 is mounted in a tray 15 between adjacent parallel cross-beams 8 and 9. One of the trays 15 with its block 7 is shown in greater detail in FIGS. 3 to 5, being hinged at one side to a crossbeam 9 and latching at the opposite side to a crossbeam 8. A latch lever 16 extends downwardly from each of the cross-beams 8 and latches the tray carrying its block in insulating position. By actuation of the lever 16 the block in its tray can be unlatched from its operative position and falls by hinging downwardly away from the furnace floor to its inoperative position thereby removing the thermal insulation from the part of the floor formerly faced and insulated by the block 7. The space between the brick walls 14 and the bottom I-beams 13 permits a workman to release manually such of the latches 16 or replace such of the blocks as are necessary to selectively adjust the radiation losses from the furnace floor.

Each of the trays 15 is in the form of a rectangular open frame construction whose longer sides 17 and 18 are formed of angle section members. One end 19 of the frame is closed by an angle section member, whereas the other end of the frame remains open, the frame being completed at that end by a strip-shaped strut 20. A central strengthening strut 21 extends between the longer sides 17 and 18.

Along the inner faces of the sides angles sections 17 and 18 of the frame there are welded guide rods 22 and 23, and the block 7 of thermally insulating material, for example, sillimanite is formed in its longer sides with corresponding grooves 24 and 25 so that the block 7 can be slid into the tray over the open end 20 of the frame, being guided into position on the guide rods 22 and 23.

Beneath the angle section 17 of the frame and spaced from the shorter sides of the frame two hooks 26 are welded. The hooks are formed from bent metal strips and are then welded beneath the side 17 of the frame. The hooks 26 hook over a hinge rod 28 which is bent at its ends and welded, as indicated at 29, to the outer face of the inner upstanding flange 30 of the crossbeam channel section 9. The spacing of the central part of the rod 28 from the flange 30 is sufficient to permit the hooks 26 to engage freely over the hinge rod 28 and to permit rotation of the hooks 26 on the rod when the insulation block in its tray is being moved into and out of insulating position.

An eye 30 is welded centrally to the side member 18 of the frame beneath the frame as illustrated in FIG. 4 and a tool held by the workman can be engaged in the eye when it is desired to raise the tray carrying the block 7 from its hinged-down position into its insulating position beneath the furnace floor.

The latch lever 16 for locking the tray with its block 7 in position beneath the furnace floor is mounted on the adjacent parallel crossbeam 8. A short channel member 31 has its back 32 welded to the bottom of the crossbeam 8 and a pivot bolt 33 extends between the two downwardly directed flanges of the member 31. The bolt 33 carries two spacer members 34 and between the spacer members 34 on the pivot bolt 33 there is mounted a pivot stub 35 which is welded to the latch lever 16. At its upper end the latch lever 16 is shaped so that when the lever extends downwardly about the pivot to the limit of rotation of the stub 35 about the bolt determined by engagement of the top of the stub 35 with the back 32 of the channel member 31, then the upper end 37 of the latch lever engages beneath the angle section 18. The latch lever 16 is angled downwardly from its vertical part to which the pivot stub is welded, as indicated in full lines in FIG. 4 and at its lower end the lever is formed as an eye 38 in which a hooked tool carried by the workman can be engaged.

The back of the channel member 31 is bevelled, as shown at 39, so as to permit the lever 16 to be pulled by engagement of the eye 38 in the direction 40 to the position illustrated in FIG. 4 in dotted lines. When the latch lever 16 is so moved the latching end 37 disengages from beneath the side member 18 of the tray and the tray carrying the block 7 hinges downwardly about the hinge rod 28 until it is depending downwardly from that rod in a substantially vertical position beneath the furnace floor as illustrated at 41.

In its inoperative position 41 the block performs very little insulating function relative to the floor of the furnace and so the workman can regulate the heat lost from different areas of the floor of the furnace by simply unlatching the insulation blocks and permitting them to hinge away from the furnace floor or by relocking unlatched blocks into insulating position facing the undersurface of the floor of the furnace. In order to replace a block the workman engages the eye 30 with his hooked tool and lifts the tray carrying the block 7 back into insulating position. As the block is hinged upwardly it engages under the sloping part 37 of the upper end of the latch lever 16 and pushes the lever causing it to pivot out of the way and enable the block to be hinged upwardly to its operative position. The latch lever then falls back to the position indicated by full lines in FIG. 4 when the block has been lifted just above the upper end of the lever and the workman permits the block to drop down onto the end of the latch lever 16 so that it is locked in insulating position.

Thus by the selective insulation of different areas of the floor of the furnace, heat losses from the floor of the furnace are regulated. Either a single block or a group of blocks of the array can be selectively taken into or out of operative position so as to control the currents in the molten glass flowing adjacent the bottom of the furnace. If desired the whole of the thermal insulation may be dispensed with by unlatching all the blocks, or in some instances the whole of the insulation may be placed in position thereby considerably decreasing the heat losses by radiation and so decreasing the amount of heat which is supplied to the melting furnace.

In the glass melting process heat is transmitted from the headspace beneath the crown of the furnace through the upper layers of molten material down to the deeper layers including the lower layer flowing along the floor of the furnace and by the provision of selective insulation of the furnace floor it is possible to maintain a desired temperature in the bottom layer of molten glass in the furnace regardless of any variation in the heat transmission characteristics of the top layer of molten glass during the glass melting process in which the glass forming materials are being absorbed into the upper layers of the molten mass in the furnace.

We claim:

1. A glass melting furnace having a floor, an array of blocks of thermal insulation material mounted beneath the furnace, which array extends beneath the whole of the floor of the furnace for thermally insulating that floor, a mounting for each block, which includes hinge means mounted beneath the furnace for moving each block in its mounting from an inoperative position spaced from the floor of the furnace to an insulating position in which latch means lock the blocks in the insulating position facing the undersurface of the furnace floor, whereby different areas of the floor of the furnace may be selectively insulated.

2. A glass melting furnace according to claim 1, wherein each insulating block is mounted in a tray which is hinged to a crossbeam mounted beneath the furnace floor, and a latch for holding the tray in position is mounted on an adjacent parallel crossbeam, the cross-beams being arranged in rows beneath the furnace to carry the blocks in a linear array beneath the furnace floor.

3. A glass melting furnace according to claim 2, wherein each tray is latched in position by a latch lever pivotally mounted on one of said cross-beams, each latch lever being shaped so as to be releasable manually to permit the block in its tray to fall to its inoperative position.

4. A glass melting furnace, according to claim 2 wherein each tray comprises at least one guide rod, and each block comprises a groove adapted to receive said guide rod for the purpose of guiding the block into the proper position in the tray.

* * * * *